United States Patent
Tang et al.

(10) Patent No.: US 11,023,958 B2
(45) Date of Patent: Jun. 1, 2021

(54) SMART MEASUREMENT POINTS

(71) Applicant: Walmart Apollo, LLC, Bentonville, AR (US)

(72) Inventors: Anthony Tang, San Diego, CA (US); Swetharam Kasireddi, Santa Clara, CA (US); Justin Rubin, San Diego, CA (US); Gholamreza Esfandani Bozchelouei, Carlsbad, CA (US); Girish Subramanian, San Diego, CA (US); Duy Le, San Diego, CA (US); Shriram Sharma, San Diego, CA (US); Stephen Bitondo, Carlsbad, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 491 days.

(21) Appl. No.: 15/883,008

(22) Filed: Jan. 29, 2018

(65) Prior Publication Data

US 2019/0236687 A1 Aug. 1, 2019

(51) Int. Cl.
*G06Q 30/06* (2012.01)
*G06F 9/451* (2018.01)
*G06Q 30/02* (2012.01)
*G06F 16/9038* (2019.01)

(52) U.S. Cl.
CPC ......... *G06Q 30/0641* (2013.01); *G06F 9/451* (2018.02); *G06F 16/9038* (2019.01); *G06Q 30/0201* (2013.01)

(58) Field of Classification Search
None
See application file for complete search history.

(56) References Cited

U.S. PATENT DOCUMENTS 9,672,552 B2 * 6/2017 Warren .............. G06Q 30/0623
2014/0082593 A1 * 3/2014 Alper .................. G06F 11/3672
717/126

OTHER PUBLICATIONS

Ge et al. "User-perceived Recommendation Quality—Factoring in the User Interface", ACM RecSys 2010 Worship, CEUR-WS.org, 2010, p. 22-25 (Year: 2010).*

* cited by examiner

*Primary Examiner* — Roy Y Yi
(74) *Attorney, Agent, or Firm* — Duane Morris LLP; Manita Rawat

(57) ABSTRACT

Systems and methods for dynamically defining smart measurement points are disclosed. A first experiment configured to provide one of a base element or a variant element is defined and the first experiment is associated with a first page. The first experiment includes a first dynamically defined qualifying measurement point. A plurality of records each comprising one or more variables indicative of an interaction between one of the plurality of user systems and the computing device are generated and a search query including the first dynamically defined qualifying measurement point is received. Each record received is searched. For each record containing the first dynamically defined qualifying measurement point, an associated one of the plurality of user devices is qualified for the at least one experiment and, for each remaining record, the associated one of the plurality of user devices is excluded for the at least one experiment.

20 Claims, 5 Drawing Sheets

SMART MEASUREMENT POINTS

TECHNICAL FIELD

This application relates generally to A/B testing platforms and, more particularly, relates defining measuring points in an A/B testing system.

BACKGROUND

A/B testing (also known as split testing or bucket testing) is a method of comparing two versions of a system against each other to determine which system performs better with respect to one or more selected metrics. A/B testing presents two or more variants of a system to a selection of users at random and statistical analysis is used to determine which variation performs better for a given system goal. In some instances, A/B testing is performed between a current production version of a system and a potential implementation of a system.

In order to determine system performance, A/B testing requires identification of system versions. A user may be provided either a current version (control) or a variation of the current version (test) and the user engagement with each version is measured. The measurement can occur at one or more measurement points defined by the system. In some instances, the measurement points correspond to user interactions with the system.

SUMMARY

In various embodiments, a system is disclosed. The system includes a computing device configured to define a first experiment configured to provide one of a base element or a variant element. The first experiment is associated with a first page and the first experiment includes a first dynamically defined qualifying measurement point. A plurality of records each comprising one or more variables indicative of an interaction between one of the plurality of user systems and the computing device is generated and a search query including the first dynamically defined qualifying measurement point is received. Each record received at the computing device is searched. For each record containing the first dynamically defined qualifying measurement point, an associated one of the plurality of user devices is qualified for at least one experiment and, for each remaining record, the associated one of the plurality of user devices is not qualified for the at least one experiment.

In various embodiments, a non-transitory computer readable medium has instructions stored thereon. The instructions, when executed by a processor cause a device to perform operations including defining a first experiment configured to provide one of a base element or a variant element. The first experiment is associated with a first page and the first experiment includes a first dynamically defined qualifying measurement point. A plurality of records each comprising one or more variables indicative of an interaction between one of the plurality of user systems and the computing device are generated and a search query including the first dynamically defined qualifying measurement point is received. Each record is searched. For each record containing the first dynamically defined qualifying measurement point, an associated one of the plurality of user devices is qualified for the at least one experiment and, for each remaining record, the associated one of the plurality of user devices is not qualified for the at least one experiment.

In various embodiments, a method is disclosed. The method includes the step of defining a first experiment configured to provide one of a base element or a variant element. The first experiment is associated with a first page and the first experiment includes a first dynamically defined qualifying measurement point. A plurality of records each comprising one or more variables indicative of an interaction between one of the plurality of user systems and the computing device are generated and a search query including the first dynamically defined qualifying measurement point is received. Each record is searched. For each record containing the first dynamically defined qualifying measurement point, an associated one of the plurality of user devices is qualified for the at least one experiment and, for each remaining record, the associated one of the plurality of user devices is not qualified for the at least one experiment.

BRIEF DESCRIPTION OF THE DRAWINGS

The features and advantages will be more fully disclosed in, or rendered obvious by the following detailed description of the preferred embodiments, which are to be considered together with the accompanying drawings wherein like numbers refer to like parts and further wherein.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

In various embodiments, a method of generating smart measurement points for an A/B testing system is disclosed. The method includes receiving a user input identifying at least one beacon identifier. The beacon identifier is related to an experiment implemented by the A/B testing system and identifies at least one variation presented by the A/B testing system.

Figure 1:
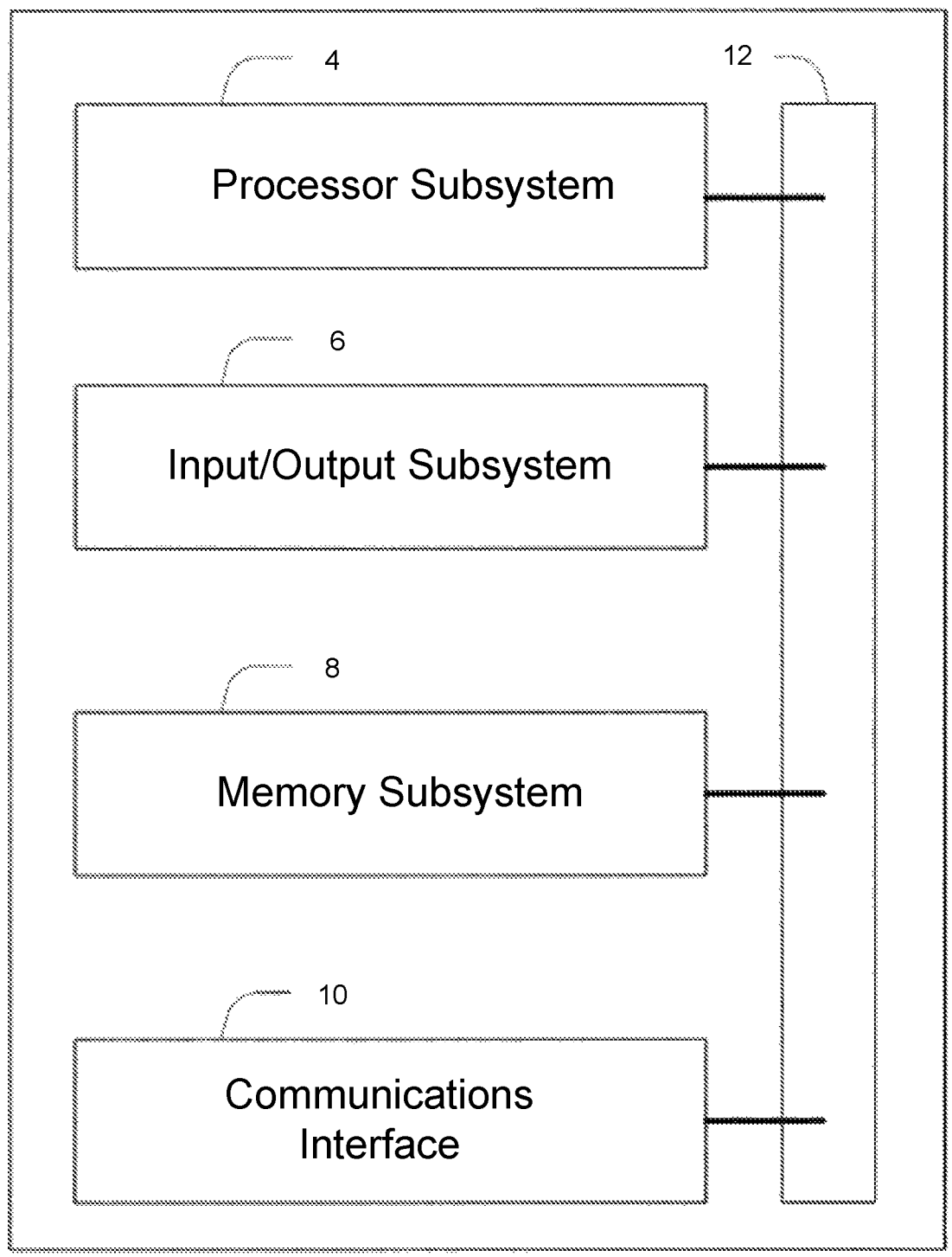
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 4 components may be combined or omitted such as, for example, not including a input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including AB testing and smart measurement points, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
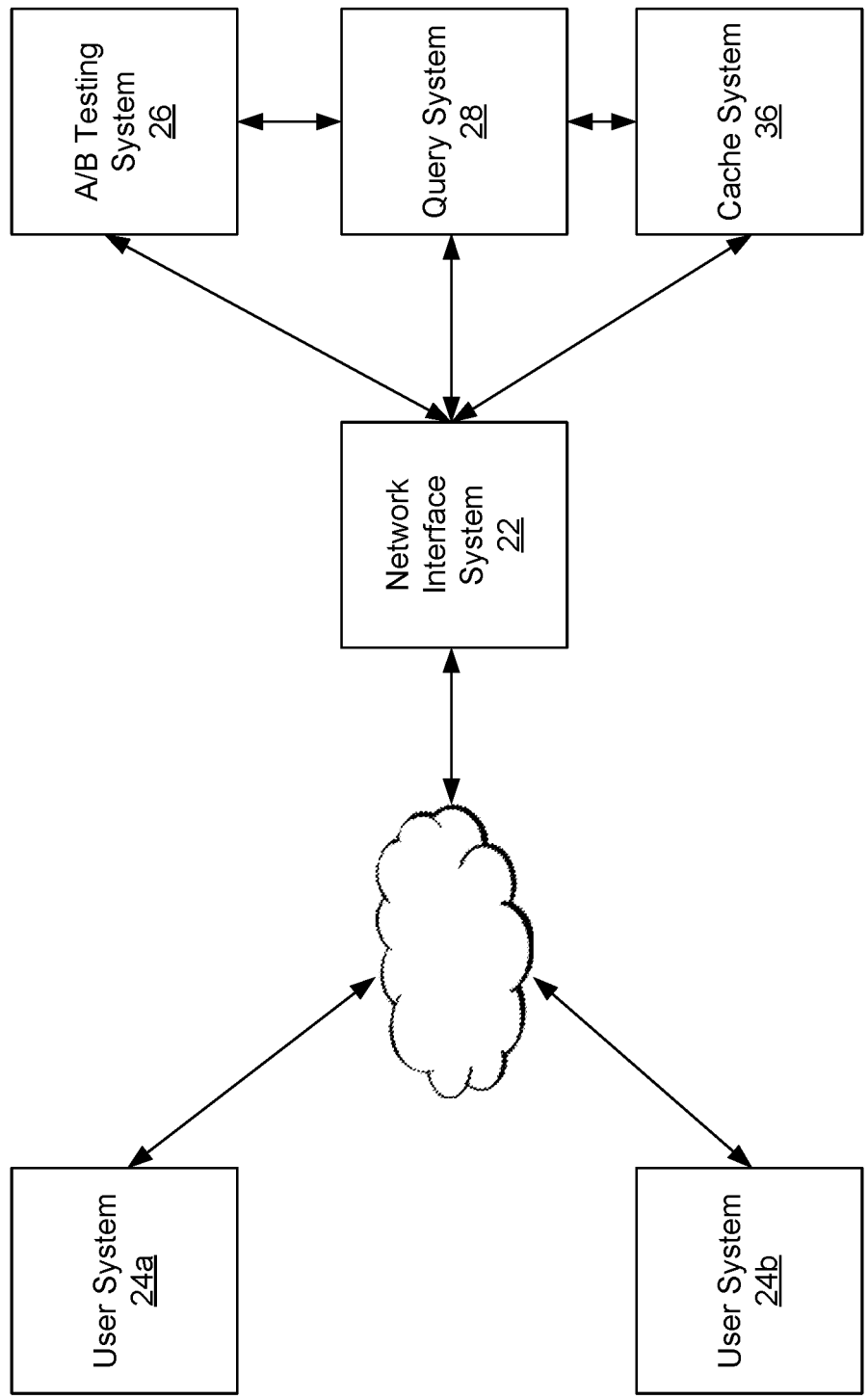
FIG. 2 illustrates a network configured to provide A/B testing, in accordance with some embodiments.

FIG. 2 illustrates a network 20 including a network access system 22, a first user system 24*a*, a second user system 24*b*, an A/B testing system 26, a query system 28, and a cache system 36. Each of the systems 22, 24*a*, 24*b* 26, 28, 36 can include a system 2 as described above with respect to FIG. 1, and similar description is not repeated herein. Although the systems are each illustrated as independent systems, it will be appreciated that each of the systems may be combined, separated, and/or integrated into one or more additional systems. For example, in some embodiments, network access system 22, the A/B testing system 26, the query system 28, and/or the cache server 36 may be implemented by a shared server or shared network system. Similarly, the user systems 24*a*, 24*b* may be integrated into additional user systems, such as a networked system or server in a user environment.

In some embodiments, the network access system 22 is configured to provide a network interface to each of the user systems 24*a*, 24*b*. For example, in some embodiments, the network access system 22 is configured to provide a webpage, web portal, and/or other network access interface to each of the user systems 24*a*, 24*b*. As one example, in some embodiments, the network access system 22 is configured to provide a webpage having an e-commerce interface for identifying and purchasing one or more goods, although it will be appreciated that the disclosed systems and methods can be applied to any suitable network access interface provided via a network to one or more systems. In some embodiments, the network access system 22 includes a front-end webserver, although it will be appreciated that the network access system 22 can include any suitable front-end system.

In some embodiments, the network access system 22 is configured to provide a network access interface including one or more pages. The term "page" is used herein to refer to specific portions of the network access interface, including, but not limited to, one or more static interfaces (e.g., webpages, files, etc.), one or more dynamic interfaces (e.g., graphical user interface, video interface, virtual reality interface, etc.), applications (e.g., mobile applications, desktop applications, etc.) and/or any other suitable interface. Each page includes one or more elements provided to a user system 24a, 24b, for example, for presentation to a user, for processing, etc. As used herein, the term "element" can refer to any content included in a page, including, but not limited to, presentation content (e.g., text, figures, backgrounds, colors, etc.), processing content (e.g., non-user visible code, executables, etc.), passive content (e.g., sensors, loggers, etc.), and/or any other suitable content.

In some embodiments, the A/B testing system 26 is configured to implement one or more experiments. Experiments include variations of at least one element included in a page and are designed to assess one or more metrics with respect to a variant element. For example, in some embodiments, a page can include a base (or control) element or at least one variant of the element. The variant element alters at least one user presentation and/or interaction with the page. For example, in various embodiments, a variant element can include variant content (e.g., variant banners, images, text, colors, etc.), variant positions, variant responses, etc. as compared to a base element. When a user system 24a, 24b connects to the A/B testing system 26, the user system 24a, 24b is randomly assigned to one or more experiments for each page included in the network interface. For each experiment, a user system 24a, 24b is designated as being in either a control group (i.e., receiving the base element) or a variant group (i.e., receiving a variant element). Interactions between the user systems 24a, 24b and the network access system 22 can be analyzed to determine whether a variant element increases one or more desired metrics. Desired metrics can include domain specific metrics. For example, metrics in an e-commerce environment may include engagement time, completion percentage, processing time, and/or any other suitable e-commerce metric.

In some embodiments, the A/B testing system 26 implements multiple experiments per page. Multiple experiments on a single page may alter the same and/or different elements presented on the page. Experiments that provide variant elements for the same element and/or that make non-compatible changes are considered mutually exclusive (i.e., the experiments cannot or should not be presented together). Mutually exclusive variant elements are positioned within a single "layer" of the A/B testing system 26 such that each "layer" includes elements of mutually exclusive experiments. For example, in some embodiments, the A/B testing system 26 includes a first base element, a first experiment including a first variant element that modifies the first base element, and a second experiment including a second variant element that modifies the first base element. Because both the first variant element and the second variant element modify the first base element, the first variant element and the second variant element cannot be utilized simultaneously and the first experiment and the second experiment are mutually exclusive with each other (and with the base element). Mutually exclusivity of two or more elements is enforced by configuring mutually exclusive variant elements in the same layer in the A/B testing system 26.

Experiments that are not mutually exclusive (i.e., include variant elements that are compatible or can be presented together) are included on separate layers and can be presented simultaneously to a user. For example, in some embodiments, a user system 24a, 24b can be assigned to, at most, one experiment per layer for two or more layers maintained by the A/B testing system 26, such as a first layer and a second layer. Each of the user systems 24a, 24b can receive a page including a control element or a single variant element for the first layer and a control element or a single variant element for the second layer. The network access interface can include any number of layers defining any number of mutually exclusive elements and/or variants.

When a user system 24a, 24b interacts with the network access system 22 portion, the A/B testing system 26 automatically assigns the user system 24a, 24b to one or more experiments (with at most one experiment per layer). Within each experiment, the user system 24a, 24b is assigned to a control group or a variant group for that experiment. The user may be assigned in one experiment per layer per page (e.g., each of one mutually exclusive variant can be selected). For example, in embodiments including an e-commerce interface, each presented page of the e-commerce network can contain multiple layers each having one or more experiments. When a user system 24a, 24b interacts with a specific webpage, the A/B testing system 26 provides, at most, one selected control or variant element for each layer contained within the selected webpage. For example, in one embodiment, a page may contain a first control element or a first variant element contained in a first layer and a second control element or a second variant element contained in a second layer of the page.

As another example, in one embodiment including a page having a single experiment including a single variant element, each of the user systems 24a, 24b that interacts with the page and that is assigned to the experiment is provided either a version of the page containing the base element or a version of the page containing the variant element. Various iterations may result in the following assignments: first user system 24a assigned to base element, second user system 24b assigned to variant element; first user system 24a assigned to variant element, second user system 24b assigned to base element; each of the first user system 24a and the second user system 24b are assigned to the base element; or each of the first user system 24a and the second user system 24b are assigned to the variant element. Additional user systems (not shown) and/or additional experiments (in the same or different layers) exponentially increase the potential number of iterations that are possible for assignment and presentation to user systems 24a, 24b.

Each interaction between a user system 24a, 24b and the network access system 22 includes a data exchange. In some embodiments, each data exchange includes an identifier generated by the user system 24a, 24b and/or the network system 22 that provides information regarding the interaction, for example, identifiers regarding which pages (or other elements) of the network access system 22 were accessed/requested by the user system 24a, 24b. The user identifier may be generated by the user system (e.g., a beacon, a cookie, etc.), generated by the network access system (e.g., a log, a cookie, a cache key, etc.), sensor data, etc. (collectively referred to herein as records).

In some embodiments, a record includes one or more elements related to and/or indicative of interactions between the user system 24a, 24b and the network access system 22. For example, in some embodiments, a first variable includes a value indicating that a user system 24a interacted with a first page. The value may be any suitably unique identifier that associates the user system 24a with the page. Because the user system 24a interacted with a page, the user system is qualified to be included in analysis of any experiments presented on that page and for which the user system 24a is assigned.

As another example, in some embodiments, a record includes a variable indicative of an interaction between a user system 24a and a specific element presented by the network access system 22. For example, in some embodiments, a variable may be generated by interactions with an element and have a first value for interactions with a control element and a second value for interactions with a variant element. Because the user system 24a interacted with an element having one or more potential variants, the user system 24a is qualified to be included in analysis only for the experiment including that element. Although specific embodiments are discussed herein, it will be appreciated that records can include multiple elements (or identifiers) relating to interactions between a user system 24a, 24b and the network access system 22 that may be used to qualify a user system 24a, 24b for inclusion in an experiment.

In some embodiments, one or more values stored in the record are generated based on and/or provided by a identifier stored on the user system 24a, 24b by the network access system 22 (such as a cookie). For example, in some embodiments, the identifier contains variables for base and/or variant elements for experiments in which the user system 24a, 24b is assigned. When the user system 24a, 24b requests a page corresponding to the experiment, the identifier provides the values identifying the base or variant element to be provided by the network access system 22 to the user system 24a, 24b. In other embodiments, the identifier includes an experiment variable indicating that the user system 24a, 24b has been assigned to an experiment and relies on the network access system 22 to select the correct base or variant element for presentation to the user system 24a, 24b.

In some embodiments, a user system 24a, 24b is assigned in one or more experiments during an initial interaction between the user system 24a, 24b and the network access system 22 and the network access system 22 generates an identifier for transmittal to and/or storage on the user system 24a, 24b. In some embodiments, the identifier includes a variable for each of the experiments in which the user system 24a, 24b is currently assigned. In other embodiments, identifiers are generated for each page containing one or more experiments when a user device 24a, 24b initially interacts with that page. It will be appreciated that any suitable identifier, including a user-generated identifier, system-generated identifier, universal identifier, etc. can be used.

The user system 24a, 24b interacts with a page (or other interface element) provided by the network access system 22 to perform one or more operations. For example, typical interactions in an e-commerce network access system 22 include, but are not limited to, identifying product categories or search terms of interest, selecting one or more items for inclusion in a user cart, performing a check-out operation, creating a user account, etc. When a user system 24a, 24b interacts with a page containing an experiment, subsequent interactions between the user system 24a, 24b and the network access system 22 can be analyzed to determine the effectiveness of the variant element included in the experiment. If a user system 24a, 24b interacts with a page including an experiment and the user system 24a, 24b is provided either a base element or the variant element associated with the experiment, the user system 24a, 24b is considered "qualified" to be included in analysis of the experiment presented on the page.

For example, in some embodiments, a network access system 22 is configured to provide a webpage which can potentially contain two variant elements. A first user system 24a interacts with a first version of the webpage containing the first base element and a second user system 24b interacts with a second version of the webpage containing a first variant element. The subsequent interactions between the first user system 24a and the network access system 22 can be compared to the subsequent interactions between the second user system 24b and the network access system 22 to determine the effectiveness of the first variant element as compared to the base element. A user system 24a, 24b that interacts with a page potentially containing a variant element is "qualified" for inclusion in analysis of any variant element presented on the page. In order to analyze the effectiveness of variant elements, user systems 24a, 24b which interact with pages or other elements of the network access system 22 potentially containing variant elements must be identified.

In some embodiments, the A/B testing system 26 is configured to receive queries and/or analytic requests from one or more query systems 28. The query systems 28 can include a system 2 as described above with respect to FIG. 1, and similar description is not repeated herein. In some embodiments, the query system 28 is associated with the same entity and/or organization that provides the network access system 22. The query system 28 is configured to generate one or more analytical queries regarding interactions between the network access system 22 and the user systems 24a, 24b. In some embodiments, the query system 28 is configured to evaluate one or more experiments implemented by the A/B testing system 26 by comparing interactions between the network access system 22 and user systems 24a, 24b including one or more variant elements. The query system 28 is configured to identify one or more metrics for analyzing interactions. For example, in an e-commerce embodiment, the query system 28 can be configured to analyze whether a product was added to a cart, whether the product was purchased, whether a loyalty program was used, etc. It will be appreciated that any suitable metrics can be defined for any environment presented by the network access system 22.

In traditional A/B testing systems, a qualifying event must be hardcoded into the A/B system 26 to allow the query system 28 to request data regarding user systems 24a, 24b that qualify for one or more experiments. Such hardcoding is labor and time intensive. Further, teams responsible for configuring and running A/B experiments are often separate from teams or individuals given access to change or add hardcoded qualifying events to the A/B testing system 26. As such, experiments must use pre-coded qualifying events or provide ample time for updates to the A/B testing system 26 to allow for new or alternative qualifying events and/or beacon identifiers, which results in restricted experiments and/or delays in deploying one or more variant elements.

In some embodiments, the query system 28 is configured to dynamically define events that qualify user systems 24a, 24b for inclusion in an experimental analysis query. As discussed above, a qualifying event includes an interaction between the user system 24a, 24b and the network access system 22 that potentially exposed the user system 24a, 24b to a variant element. For example, in some embodiments, if a variant element may be included on a homepage provided by the network access system 22, any user system 24a, 24b that visits the homepage during their interaction with the network access system 22 should be included in experimental analysis of the variant element (i.e., is qualified).

By dynamically defining qualifying events, the query system 28 can generate and/or analyze experiments based on selected parameters without the need to hardcode such parameters into the A/B testing system 26. For example, in some embodiments, a user of the query system 28 can define an experiment dynamically by searching for one or more elements in a record that indicate a user system 24a, 24b had a specific interaction with the network access system 22, for example, viewing a specific webpage. For example, in one embodiment, a user defining a query may want to define an experiment based on variant elements presented on a homepage provided by the network access system 22. The user may define a query in the query system 28 to search for all records including a value indicating that the user system 24*a*, 24*b* interacted with the homepage, e.g., query_map[a] =homepage. Although specific examples of elements and values contained within records are discussed herein, it will be appreciated that these are presented only as examples and the records can contain any suitable elements or values based on the network access system 22 and/or the user systems 24*a*, 24*b*. One or more dynamically defined parameters are referred to herein as "smart measurement points."

As another example, in one embodiments, a user defining a query may want to define an experiment based on variant elements presented on a homepage provided by the network access system 22 and wants to exclude any interaction that included a specific variant element (for example, if the user believes that a variant element or experiment on a first layer is impacting interactions of users with other elements on a second layer). The user may define a query in the query system 28 to search for all records including a value indicating that a user system 24*a*, 24*b* interacted with the homepage and also exclude all interactions that presented the specific variant element, e.g., query_map[a]=homepage & query_map[b]≠variant_element_1.

In each of the above examples, the user may select both the "query_map[a]" element and the "query_map[b]" element as search parameters even when these parameters are not hardcoded into the A/B testing system 26 as being valid qualifying events. Dynamically defining qualifying events provides several benefits over static (or hardcoding) of qualifying events in A/B testing system 26. For example, the dynamically defined smart measurement points allow users to define experiments based on record values before, during, and/or after presentation of variant elements to user systems 24*a*, 24*b* without knowing which record values will be the best qualifying events prior to running the experiment. Further, dynamically defining qualifying events allows experiments to be defined using existing variant element presentations that have not been previously compared, such as defining an experiment to include multiple variant elements across multiple layers.

Figure 3:
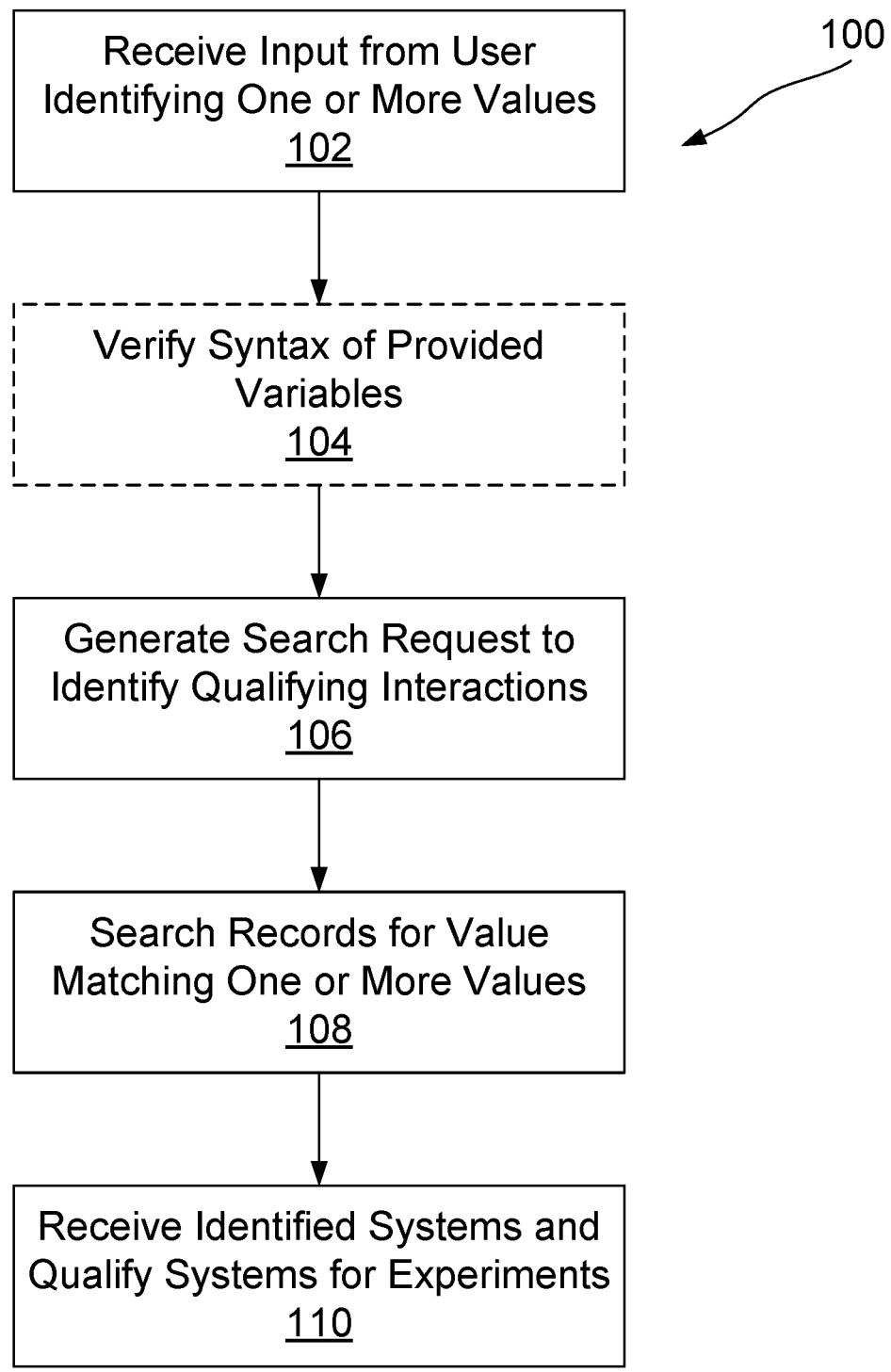
FIG. 3 is a flowchart illustrating a process of dynamically qualifying a user system for inclusion in one or more experiments based on one or more dynamically defined smart measurement points, in accordance with some embodiments.

FIG. 3 is a flowchart illustrating a process 100 of dynamically qualifying user systems 24*a*, 24*b* for inclusion in one or more experiments based on one or more dynamically defined smart measurement points. The process 100 allows a user to dynamically define one or more smart measurement points (e.g., qualifying events) between the user system 24*a*, 24*b* and the network access system 22 without hardcoding such smart measurement points in the A/B testing system 26. At step 102, the query system 26 receives an input from a user identifying one or more values indicative of a specific interaction between a user system and the network access system 22. For example, in various embodiments, the user input includes at least one element or variable that is included in a record when a user system interacts with a predetermined page of the network access system 22.

For example, in some embodiments, the query system 28 receives an input identifying a variable (or key) that is included in a record when the user system 24*a*, 24*b* performs a specific interaction with the network access system 22. The key can correspond to a variable value contained in a record, such as any suitable variable, string, block, etc. contained within a record. In some embodiments, the key defines a variable and one or more values of the variable.

At optional step 104, the query system 28 verifies the syntax of the provided variables (or keys). The query system 26 may have one or more predefined types of variables that are valid inputs to generate smart measurement points. For example, various valid variables may include, but are not limited an action and a context, an identifier, a state, etc. Each of the valid variable types has a specific syntax for generating a smart measurement point based on the input. For example, in some embodiments, the input may require an action identifier (e.g., variable name), and a context (e.g., variable value). Although specific examples are discussed herein, it will be appreciated that any suitable syntax can be used for defining smart measurement points.

In some embodiments, the query system 28 may limit the input length for each variable. For example, in various embodiments, the query system 28 may include a limit for an action field, a limit for a context (e.g., value) field, and/or any other suitable field limit. The query system 28 may further limit the total length of an input, such as, for example, having a character limit for the total number of variables that can be defined. Each of these limits may be verified by the query system 28 during optional step 104. Although the query system 28 verifies the syntax of the input, the query system 28 does not verify that the provided variable is a real variable (i.e., does not verify that the variable is generated during at least one interaction between the user system 24*a*, 24*b* and the network interface system 22).

At step 106, the query system 28 generates a search request to identify qualifying interactions between the network access system 22 and one or more user systems 24*a*, 24*b*. The request includes the one or more dynamically defined smart measurement points. The request is provided to a suitable system, such as the A/B testing system 26, which maintains one or more records. In some embodiments, the query system 28 formats the request according to a predetermined syntax that identifies each of the smart measurement points.

At step 108, the request is received from the query system 28 at a predetermined system, such as the A/B testing system 26. The A/B testing system 26 performs a database search of records and identifies records having values matching the defined smart measurement points. In some embodiments, the A/B testing system 26 identifies records for the defined smart measurement points by determining only whether a record (such as a beacon, server log, etc.) contains a value identical to the defined smart measurement points. If a recorded satisfies the smart measurement points defined in the request, the A/B testing system 26 qualifies the user system 24*a* associated with the record for the experimental query.

At step 110, the query system 28 receives the identified qualified system interactions from the A/B testing system 26 and qualifies each of the identified user system 24*a*, 24*b* for additional analysis to evaluate the qualified experiments (as defined by the dynamically defined smart measurement points).

Figure 4:
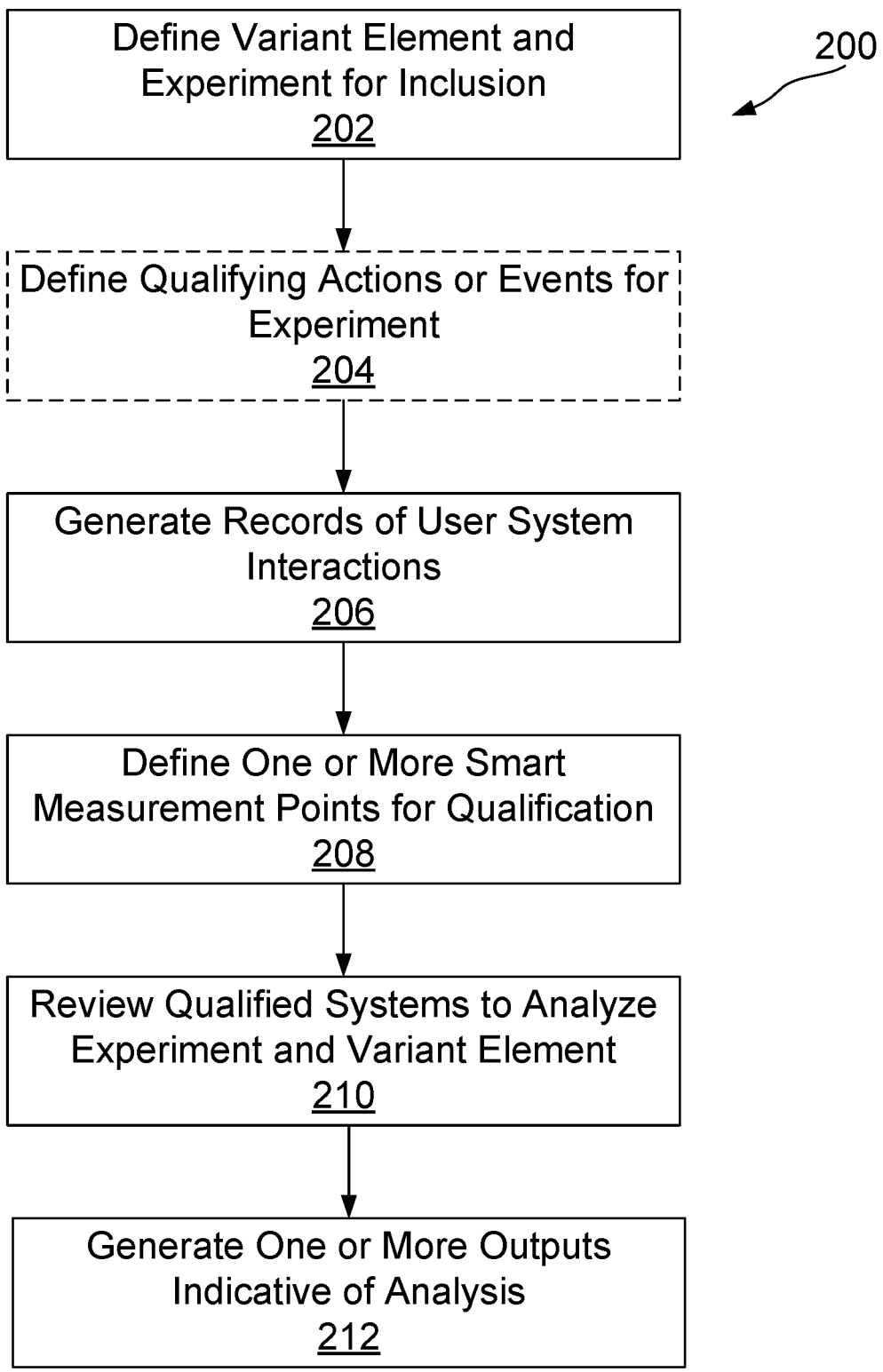
FIG. 4 illustrates a process of generating and reviewing an experiment using an A/B testing system and one or more smart measurement points, in accordance with some embodiments.

FIG. 4 illustrates a process 200 of generating and reviewing an experiment using an A/B testing system 26 and one or more smart measurement points, in accordance with some embodiments. At step 202, a user interacts with the A/B testing system 28 to provide at least one variant element for presentation to user systems 24*a*, 24*b* (e.g., a variant element to be included in an experiment). In some embodiments, the variant elements are identified with respect to a control or base element, although it will be appreciated that experiments can be defined including only variant elements. The variant element can be generated according to any known A/B testing procedure for generating and presenting variant elements. As discussed above, each variant element provided by the A/B testing system 26 is associated with a specific page or other element provided by the network access system 22 to one or more user systems 24a, 24b.

In some embodiments, at optional step 204, the A/B testing system 26 allows a user to define one or more qualifying actions or events for the experiment. In some embodiments, the qualifying actions or events defined by the experiment are referred to as "qualifying measurement points," as the qualifying actions and/or events qualify a system for inclusion in the experiment. For example, in various embodiments, the A/B testing system 26 presents a plurality of predefined qualifying events for selection by a user and also provides an input field to allow a user to define dynamic qualifying events. The predefined qualifying events may be based on user context, such as a first set of predetermined qualifying events being provided to a first user and a second set of predetermined qualifying events being provided to a second user. The dynamic qualifying event input field allows the user to define one or more dynamic qualifying events, for example, according to a process similar to the process 100 discussed above.

For example, in some embodiments, the A/B testing system 26 allows a user to generate a new experiment and create one or more new qualifying actions by dynamically generating a smart measurement point to be associated with the experiment, define "ANY" as a qualifying action (i.e., qualify all interactions), modify one or more previously generated dynamic qualifying actions, assign permissions to one or more dynamically generated qualifying actions, select one or more predefined qualifying actions for the experiment, and/or define other attributes of dynamic or predefined qualifying actions. In some embodiments, the input field is configured to provide suggestions or completion options for dynamically defined smart measurement points.

In some embodiments, the dynamic smart measurement points are limited and/or selected based on expected user interactions or user systems 24a, 24b. For example, in some embodiments, dynamical smart measurement points may be definable for multiple search types for a first experiment (e.g., allowing query and path inquiries for desktop interactions) but limited to fewer (for example, one) search type for a second experiment (e.g., allowing only a query inquiry for a mobile environment).

At step 206, the network access system 22 is accessed by a plurality of user systems. For example, in some embodiments, the network access system 22 is a web server configured to provide a web environment, such as a plurality of related web pages, to user systems 24a, 24b. The network access system 22 is configured to provide individual pages and/or elements when requested by a user system 24a, 24b. In some embodiments, a subset of the plurality of user systems 24a, 24b that interact with the network access system 22 will be exposed to one or more variant elements. Each interaction between the user systems 24a, 24b and the network access system 22 generates a record, e.g., user generated data (such as beacons), server generated data (such as server logs), third-party generated data, and/or any other suitable data. The network access system 22 stores the records.

At step 208, a user interacts with a query system 28 to define one or more smart measurement points for experimental analysis. In some embodiments, the query system 28 implements the method 100 of dynamically qualifying user systems using at least one smart measurement point, as discussed above. The query system 28 may further present one or more system defined (or static) measurement points that are shared across multiple experiments. For example, in some embodiments, the query system 28 includes commonly-used measurement points (such as page identifiers, common elements, etc.) and also allows for dynamic definition of custom or less-used measurement points, as discussed above.

In some embodiments, the query system 28 relies on one or more qualifying measurement points defined when the experiment was created for generating queries. For example, in some embodiments, the query system 28 stores a database or other storage container identifying experiments and associated qualifying measurement points and generates a query request based on the previously defined qualifying measurement points.

In some embodiments, the query system 28 is configured to generate a request for data related to one or more measurement points, referred herein as "reportable measurement points." The reportable measurement points can be the same as and/or different from the qualifying measurement points. For example, in some embodiments, a user system 24a, 24b interaction may be qualified for inclusion in an experiment based on a first qualifying event. However, the experiment is not interested in the actual qualifying event, but some event that occurs after the user system 24a, 24b has been qualified. The query system 28 generates a query including at least one reportable measurement point. The system queried (such as the AB testing system 26) may provide only data corresponding to the reportable measurement points. Reportable measurement points may be statically and/or dynamically defined as discussed above with respect to defining qualifying measurement points.

At step 210, after receiving the identified qualifying interactions from the A/B testing system 26, the query system 28 reviews the qualifying interactions to analyze one or more of the experiments implemented by the network interface system 22. For example, the query system 28 may be configured to identify actions taken by qualifying systems 24a, 24b after qualifying for an experiment. The query system 28 can be configured to identify additional actions and/or events based on context of the network access system 22, such as, for example, actions taken in an e-commerce interface such as viewing products/advertisements, adding products to a cart, purchasing products, completing surveys, etc.

At step 212, the query system 28 is configured to generate one or more outputs based on the analysis of the qualified interactions. For example, in various embodiments, the query system 28 generates a statistical analysis of additional actions taken by user systems 24a, 24b after qualifying for one or more experiments. In other embodiments, the output can include any suitable information, such as a list of actions performed by qualified user systems 24a, 24b, a Boolean indication regarding a single action that can potentially be taken by qualifying systems 24a, 24b (e.g., completing a purchase), and/or any other suitable output.

Figure 5:
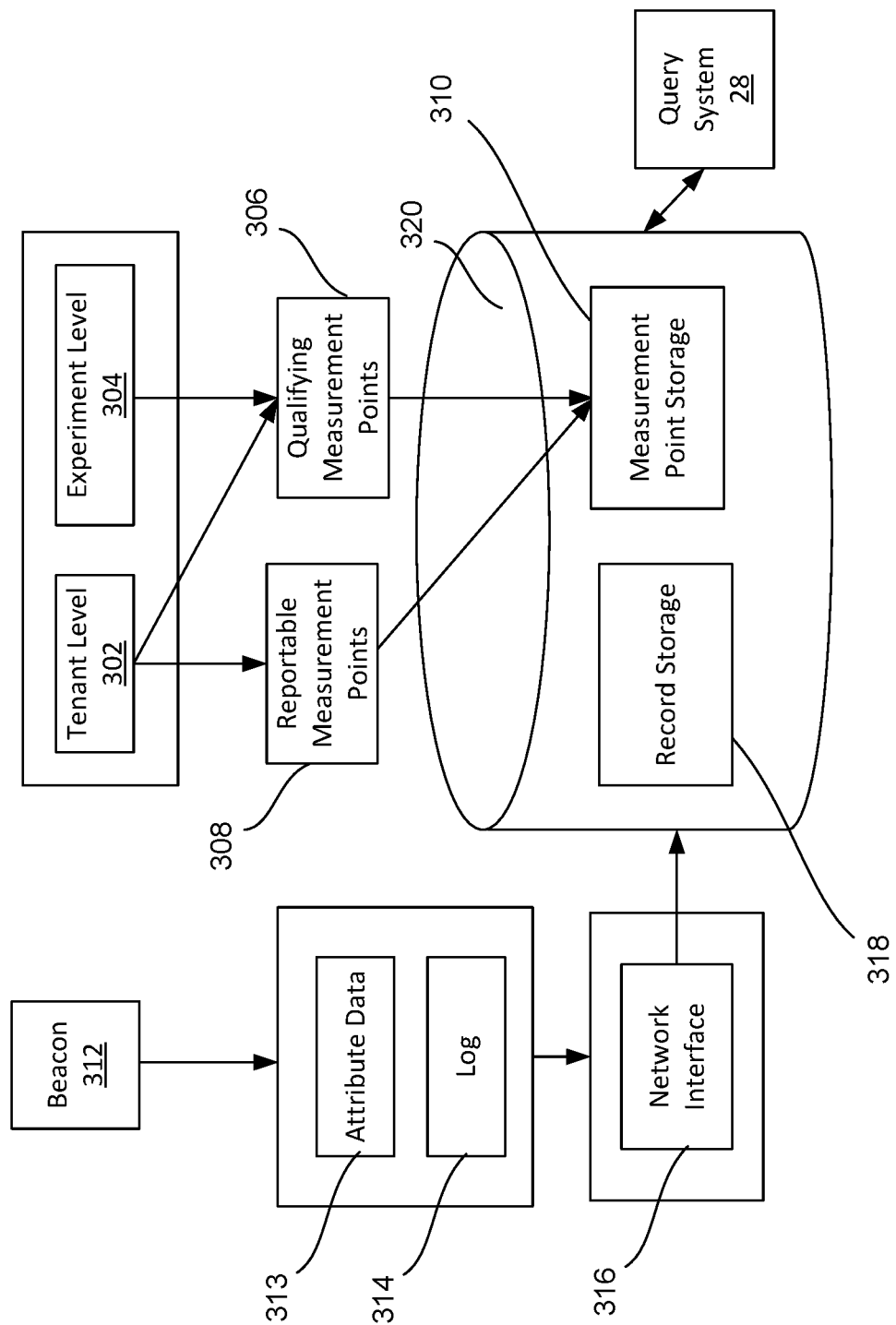
FIG. 5 is a system diagram illustrating various interactions between system elements during the process illustrated in FIG. 4, in accordance with some embodiments.

FIG. 5 is a system diagram 300 illustrating various interactions between system elements during process 200 discussed above, in accordance with some embodiments. The system diagram 300 illustrates an A/B testing system 26a including a tenant 302 and an experiment 304. The experiment 304 includes one or more qualifying measurement points 306 that are provided to a measurement point container 310 maintained by a database 320 when the experiment is created, for example, as discussed in steps 202-204 of process 200. The tenant 302 is configured to define qualifying measurement points 306 and/or reportable measuring points 308, as discussed in steps 202-208 above. The generated qualifying and reportable measurement points 306, 308 may be stored in the measurement point database 310.

When a user system 24a, 24b interacts with the network access system 22, for example at step 208 discussed above, a beacon 312 may be generated. The beacon 312 is provided to the network access system 22, which extracts attribute data 313 from the beacon 312 and generates a log 314. The beacon 312 and/or the log 314 may be provided, via a network interface 316, to a record storage container 318 maintained by a database 320. The record files are maintained by the database for later querying and/or review by one or more systems and/or users.

FIG. 5 further illustrates a query system 28 configured to generate one or more reports. The query system 28 is configured to search the database 320 (or otherwise generate a query) for records having qualifying measurement points as defined by the experiment 304 (and stored in the measurement point container 310). In some embodiments, the query system 28 receives data identifying reportable measurement points 308 from the record storage container 318 in response to a query request. The query system 28 is configured to generate one or more reports as discussed above based on the results of the query.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
a computing device communicatively coupled to a database, where the computing device is configured to:
receive a first experiment configured to provide each user system of a plurality of user systems one of a base element or a variant element, wherein the first experiment is associated with a first page, and wherein the first experiment includes a first dynamically defined qualifying measurement point indicating a qualifying event corresponding to one or more user interactions of a corresponding user system of the plurality of user systems with the first page;
generate a plurality of records based on user interaction data stored within the database, each record comprising one or more variables indicative of an interaction between one of the plurality of user systems and the computing device;
receive a search query including the first dynamically defined qualifying measurement point;
search each record of the plurality of records received at the computing device, wherein:
for each record containing the first dynamically defined qualifying measurement point, qualify the corresponding one of the plurality of user systems for the first experiment; and
for each remaining record, exclude the corresponding one of the plurality of user systems for the first experiment;
analyze the variant element based on records corresponding to qualified user systems of the plurality of user systems; and
generate one or more outputs based on the analysis of the variant element.

2. The system of claim 1, wherein the first experiment includes at least one reportable measurement point, and wherein the computing device is further configured to compare the qualified user systems to the at least one reportable measurement points.

3. The system of claim 1, wherein the first experiment includes at least one system defined measurement point, wherein each record containing the first dynamically defined qualifying measurement point is qualified for the first experiment only when the record includes the at least one system defined measurement point.

4. The system of claim 1, wherein the computing device is further configured to receive a second dynamically defined measurement point.

5. The system of claim 4, wherein the second dynamically defined measurement point is defined after at least one user system has qualified for the first experiment.

6. The system of claim 4, wherein, for each record containing the second dynamically defined measurement point, the computing device is configured to exclude the corresponding one of the plurality of user systems from the first experiment.

7. The system of claim 1, wherein the computing device is further configured to:
review a syntax of the first dynamically defined measurement point; and
generate an alert when the syntax of the first dynamically defined measurement point fails to qualify any user system.

8. The system of claim 1, wherein the computing device is further configured to:
define a second experiment configured to provide one of a second base element or a second variant element, wherein the second experiment is associated with a second page, and wherein the second experiment includes a second dynamically defined qualifying measurement point;
receive a search query including the second dynamically defined qualifying measurement point;
search each record received at the computer system, wherein:
for each record containing the second dynamically defined qualifying measurement point, qualify corresponding one of the plurality of user systems for the second experiment, wherein the second dynamically defined qualifying measurement point is different than the first dynamically defined qualifying measurement point.

9. A non-transitory computer readable medium having instructions stored thereon, wherein the instructions, when executed by a processor cause a device to perform operations comprising:
receiving a first experiment configured to provide each user system of a plurality of user systems one of a base element or a variant element, wherein the first experiment is associated with a first page, and wherein the first experiment includes a first dynamically defined qualifying measurement point indicating a qualifying event corresponding to one or more user interactions of a corresponding user system of the plurality of user systems with the first page;

generating a plurality of records based on user interaction data, each record comprising one or more variables indicative of an interaction between one of a plurality of user systems and the computing device;

receiving a search query including the first dynamically defined qualifying measurement point;

searching each record of the plurality of records, wherein:
for each record containing the first dynamically defined qualifying measurement point, qualify corresponding one of the plurality of user systems for the first experiment; and
for each remaining record, exclude the corresponding one of the plurality of user systems for the first experiment.

10. The non-transitory computer readable medium of claim 9, wherein the first experiment includes at least one reportable measurement point, and wherein the method further comprises comparing the qualified user systems to the at least one reportable measurement points.

11. The non-transitory computer readable medium of claim 9, wherein the first experiment includes at least one system defined measurement point, wherein each record containing the first dynamically defined qualifying measurement point is qualified for the first experiment only when the record includes the at least one system defined measurement point.

12. The non-transitory computer readable medium of claim 9, comprising receiving a second dynamically defined measurement point.

13. The non-transitory computer readable medium of claim 12, wherein the second dynamically defined measurement point is defined after at least one user system has qualified for the first experiment.

14. The non-transitory computer readable medium of claim 12, wherein, for each record containing the second dynamically defined measurement point, the corresponding one of the plurality of user systems is excluded from the first experiment.

15. The non-transitory computer readable medium of claim 9, wherein the computing device is further configured to:
review a syntax of the first dynamically defined measurement point; and
generate an alert when the syntax of the first dynamically defined measurement point fails to qualify any user system.

16. The non-transitory computer readable medium of claim 9, wherein the instructions further cause the device to perform operations comprising:
defining a second experiment configured to provide one of a second base element or a second variant element, wherein the second experiment is associated with a second page, and wherein the second experiment includes a second dynamically defined qualifying measurement point;
receiving a search query including the second dynamically defined qualifying measurement point;
searching each record, wherein:
for each record containing the second dynamically defined qualifying measurement point, qualify corresponding one of the plurality of user systems for the first experiment, wherein the second dynamically defined qualifying measurement point is different than the first dynamically defined qualifying measurement point.

17. A method, comprising:
receiving a first experiment configured to provide each user system of a plurality of user systems one of a base element or a variant element, wherein the first experiment is associated with a first page, and wherein the first experiment includes a first dynamically defined qualifying measurement point indicating a qualifying event corresponding to one or more user interactions of a corresponding user system of the plurality of user systems with the first page;
generating a plurality of records based on user interaction data, each record comprising one or more variables indicative of an interaction between one of a plurality of user systems and the computing device;
receiving a search query including the first dynamically defined qualifying measurement point;
searching each record of the plurality of records received, wherein:
for each record containing the first dynamically defined qualifying measurement point, qualify corresponding one of the plurality of user systems for the first experiment; and
for each remaining record, exclude the corresponding one of the plurality of user systems for the first experiment.

18. The method of claim 17, wherein the first experiment includes at least one reportable measurement point, and wherein the method further comprises comparing the qualified user systems at the at least one reportable measurement points.

19. The method of claim 17, wherein the first experiment includes at least one system defined measurement point, wherein each record containing the first dynamically defined qualifying measurement point is qualified for the first experiment only when the record includes the at least one system defined measurement point.

20. The method of claim 17, comprising receiving a second dynamically defined measurement point.

* * * * *